US006449483B1

(12) United States Patent
Akhteruzzaman et al.

(10) Patent No.: US 6,449,483 B1
(45) Date of Patent: Sep. 10, 2002

(54) WIRELESS TELEPHONE SYSTEM FOR ACCESSING MULTIPLE STATIONS VIA A SINGLE TELEPHONE NUMBER

(75) Inventors: Akhtar Akhteruzzaman, Naperville; Paul Raymond Sand, Woodridge, both of IL (US)

(73) Assignee: Lucent Technologies, Inc., Murray Hill, NJ (US)

(*) Notice: Subject to any disclaimer, the term of this patent is extended or adjusted under 35 U.S.C. 154(b) by 0 days.

(21) Appl. No.: 09/442,801

(22) Filed: Nov. 18, 1999

(51) Int. Cl.$^7$ ............................................. H04B 7/100
(52) U.S. Cl. ...................................... 455/445; 455/518
(58) Field of Search ................................ 455/422, 445, 455/551, 565, 416, 414, 432, 509, 518, 519

(56) References Cited

U.S. PATENT DOCUMENTS

| | | | | | |
|---|---|---|---|---|---|
| 5,517,551 A | * | 5/1996 | Arai | ........................... | 379/156 |
| 6,097,963 A | * | 8/2000 | Boltz et al. | ................. | 455/433 |
| 6,141,556 A | * | 10/2000 | Dougherty et al. | ......... | 455/416 |
| 6,188,901 B1 | * | 2/2001 | Ebina | ........................ | 455/445 |
| 6,240,069 B1 | * | 5/2001 | Alperovich et al. | ........ | 370/260 |

* cited by examiner

Primary Examiner—Daniel Hunter
Assistant Examiner—Nick Corsaro
(74) Attorney, Agent, or Firm—Patton Boggs, LLP

(57) ABSTRACT

The wireless telephone system for accessing multiple stations via a single telephone number provides a single telephone number for a group of subscribers who are equipped with a plurality of stations, including at least one mobile subscriber station, to thereby enable call connections to be established to any one of the mobile subscriber stations in the group when the other stations in the group are in an idle state. A plurality of mobile subscriber stations are registered as members of a group that is assigned a single telephone number. The wireless communication system tracks the present location of the plurality of mobile subscriber stations and their present busy/idle status. If a subscriber at one of the plurality of mobile subscriber stations goes off-hook to originate a call connection, the wireless communication system determines whether any other members of the group are presently engaged in an active call connection using the assigned single telephone number. If not, the call connection proceeds as usual. If the single telephone number is presently in use, the wireless communication system can provide one of a number of possible call processing options to indicate the present use of the single telephone number. Thus, the time-sharing of the single telephone number among a plurality of individuals in a group conserves telephone numbers and results in service conflicts only if multiple service requests are concurrently received. By the use of traffic engineering criteria, the instances of such service conflicts can be kept to a minimum.

18 Claims, 3 Drawing Sheets

WIRELESS TELEPHONE SYSTEM FOR ACCESSING MULTIPLE STATIONS VIA A SINGLE TELEPHONE NUMBER

FIELD OF THE INVENTION

This invention relates to wireless telephone systems that are equipped with mobile telecommunication switching offices (MTSO), each of which is connected to a plurality of cell sites (base stations) which communicate with mobile subscriber stations, located in the area covered by the cell sites, via a wireless communication paradigm, to thereby enable the subscriber to originate and receive telephone calls.

Problem

It is a problem in wireless telephone systems to provide the subscriber with the features, flexibility and cost efficiency commensurate with the wireless communication capability of the wireless telephone system. Existing wireless telephone systems are equipped with mobile telecommunication switching offices (MTSO), each of which is connected to a plurality of cell sites (base stations) which communicate with mobile subscriber stations, located in the area covered by the cell sites, via a wireless communication paradigm. This entails the provision of a one to one correspondence between the subscriber's telephone number and their mobile subscriber station. It is not uncommon for the subscriber to identify a multiplicity of individuals, such as family members, employees and the like, that are best served by a wireless telephone system, thereby requiring multiple telephone numbers, each unique to an individual and their mobile subscriber station. The various individuals may only have an occasional need for wireless communication service, but existing wireless telephone systems provide basic telephone service by requiring the use of a fixed telephone number for each mobile station, regardless of the level of call traffic and the relationship among the individuals.

This limitation results in the proliferation of telephone numbers, since an individual typically has a telephone number for their wired or cordless home telephone, a telephone number for their wireless mobile subscriber station, and possibly a telephone number for their work location. In a family environment, the family members may have multi-line service to their residence, with various family members each having their own telephone number and these same individuals may also have their own personal wireless telephone number. Thus, a single family can have a plurality of telephone numbers dedicated for their use even though their collective traffic represents a traffic load which can be handled by a single telephone line.

Solution

The above described problems are solved and a technical advance achieved by the present wireless telephone system for accessing multiple stations via a single telephone number. This system provides a single telephone number for a group of subscribers who are equipped with a plurality of stations, including at least one mobile subscriber station, to thereby enable call connections to be established to any one of the mobile subscriber stations in the group when the other stations in the group are in an idle state. In this manner, the single telephone number is shared among a plurality of subscribers who can use their mobile subscriber stations to roam away from their home location.

The present wireless telephone system for accessing multiple stations via a single telephone number registers a plurality of mobile subscriber stations as members of a group that is assigned a single telephone number. The wireless communication system tracks the present location of the plurality of mobile subscriber stations and their present busy/idle status. If a subscriber at one of the plurality of mobile subscriber stations goes off-hook to originate a call connection, the wireless communication system determines whether any other members of the group are presently engaged in an active call connection using the assigned single telephone number. If not, the call connection proceeds as usual. If the single telephone number is presently in use, the wireless communication system can provide one of a number of possible call processing options. The wireless communication system can: provide the subscriber with a prerecorded message to indicate the present use of the single telephone number, bridge the subscriber on to the existing call connection, deny service and provide an audible indication, such as a busy signal. Thus, the time-sharing of the single telephone number among a plurality of individuals in a group conserves telephone numbers and results in service conflicts only if multiple service requests are concurrently received. By the use of appropriate traffic engineering criteria, the instances of such service conflicts can be kept to a minimum.

DETAILED DESCRIPTION

Figure 1:
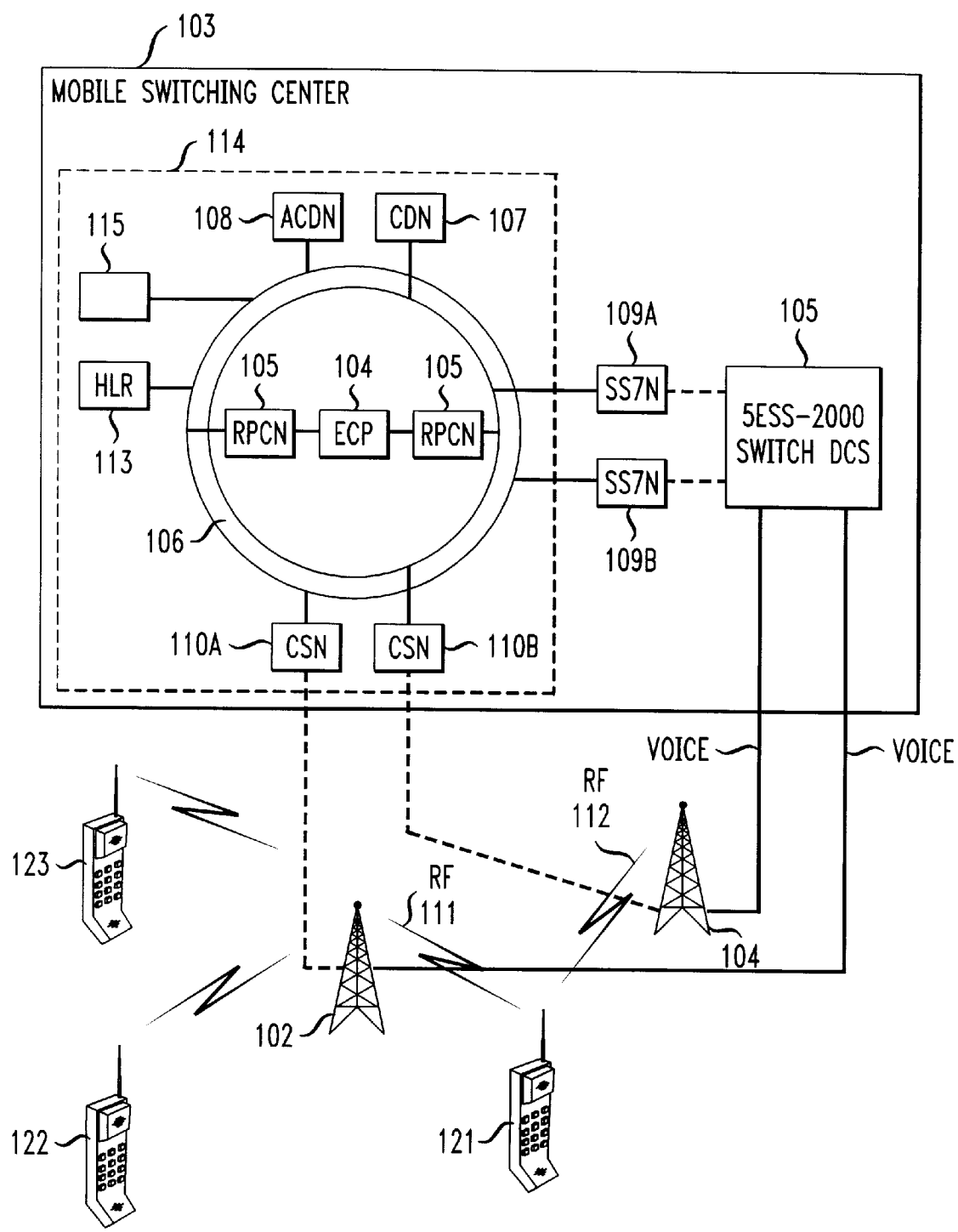
FIG. 1 illustrates in block diagram form the overall architecture of the present wireless telephone system for accessing multiple stations via a single telephone number.

Cellular mobile telecommunication systems represent one example of wireless communications systems and function to provide the service of connecting mobile telecommunications customers, each having a mobile subscriber station, to both land-based customers who are served by the common carrier public telephone network as well as other mobile telecommunications customers. In such a system, all incoming and outgoing calls are routed through the Mobile Switching Center (MSC), which is connected to a plurality of base stations which communicate with mobile subscriber stations located in the area covered by the base stations. The mobile subscriber stations are served by the base stations, each of which is located in one cell of a larger service region. Each base station in the service region is connected by a group of communication links to the mobile switching center, with the communication link being either direct or indirect through a controller that may span a plurality of base stations. A communication link transports user data, which may be a digital representation of voice, between the base station and the mobile switching center. Each base station contains a group of radio transmitters and receivers, with each transmitter-receiver pair being connected to one communication link. Each transmitter-receiver pair operates on a pair of radio frequencies: one frequency to transmit radio signals to the mobile subscriber station and the other frequency to receive radio signals from the mobile subscriber station.

With CDMA systems, a plurality of transmitter-receiver pairs share a common frequency pair. This is made possible by the orthogonal coding that is inherent with CDMA. The first stage of a cellular communications connection is executed when a transmitter-receiver pair at the base station, operating on a predetermined pair of radio frequencies, is activated and a mobile subscriber station is tuned to the same pair of radio frequencies. The second stage of the communication connection is executed at the mobile switching office during which the call path is extended to outgoing or incoming trunks to the common carrier public telephone network. At this point in time, the call is considered as being established. The mobile switching center contains a switching network to switch mobile customer's voice and/or data signals from the communication link to an incoming or outgoing trunk. The mobile communication system is controlled by a mobile telecommunication controller at or remotely connected to each base station associated with the mobile switching center. A plurality of data links connect the mobile telecommunication controller and the associated base station controllers. The mobile telecommunication controller operates under control of complex software and controls the switching network. The mobile telecommunication controller also controls the actions of the associated base station controllers by generating and interpreting the control messages that are exchanged with the associated base station controllers over the data links. The base station controllers at each base station, in response to control messages from the mobile telecommunication controller, control the assignment of transmitter-receiver pairs at the base station. The control processes at each base station also control the tuning of the mobile subscriber stations to the selected radio frequency.

Each cell in the ground-based cellular mobile telecommunication network comprises a predetermined volume of space radially arranged around the base station transmitting antenna with the region of space roughly approximating a cylindrical volume having a limited height. Since all of the mobile subscriber stations are installed in ground-based units (such as motor vehicles) in traditional cellular mobile telecommunication systems, the antenna radiation pattern of the base station is aligned to be proximate to the ground and the polarization of the signals produced by the base station antenna is vertical in nature. In order to prevent the radio signals in one base station from interfering with radio signals in an adjacent base station, the transmitter-receiver frequencies and/or orthogonal coding for adjacent base stations are selected to be different so that there is sufficient signal separation between adjacent transmitter frequencies and orthogonal coding to avoid overlapping transmissions among the adjacent base stations. When a ground-based mobile subscriber station initiates a call connection, control signals from the local base station transmitter cause the frequency agile transceiver in the ground-based mobile subscriber station to operate at the frequency of operation and orthogonal coding designated for that particular base station. As the ground-based mobile subscriber station moves from one base station to another, the call connection is handed off to the successive base stations and the frequency agile transceiver in the ground-based mobile subscriber station adjusts its frequency of operation and/or orthogonal coding of the transmitter located at the base station in which the ground-based mobile subscriber station is presently operational. Furthermore, with CDMA, it is possible that a mobile subscriber station may be simultaneously communicating with a plurality of base stations. Such a configuration is commonly called a soft handoff and is preferable to hand-offs in which a mobile subscriber station is transferred from one base station to another. The latter type of handoff is commonly called a hard handoff. With a soft handoff, base stations are added or dropped from the plurality of base stations serving the mobile subscriber station as the mobile subscriber station traverses the serving area supported by the mobile switching center. However, all of the base stations in the plurality of base stations serving the mobile subscriber station must communication with the given mobile subscriber station on the same transmitter-receiver frequencies.

Wireless Communications System Architecture

In the description of the disclosed wireless telephone system for accessing multiple stations via a single telephone number, the major entities of the wireless communication system 1 are the mobile subscriber stations 121–123, base stations 102 and 104, and the Mobile Switching Center 103 as shown in FIG. 1. The Mobile Switching Center 103 contains a mobile telecommunication controller 114 which includes an executive control processor (ECP) 104 connected to a ring peripheral controller node (RPCN) 105, both of which are linked to a ring structure 106. The ring structure 106 provides a transport means for communicating among the entities within the Mobile Switching Center 103. Also contained within the mobile telecommunication controller 114 are call processing/database node (CDN) 107 and an administrative call processing node (ACDN) 108. A major function of these entitles is the execution of call processing associated with the Mobile Switching Center 103. The 5ESS-2000 Switch DCS 105 provides the telephone connectivity between base stations 102 and 104. The 5ESS-2000 Switch DCS is connected to the IMS/CNI Ring 106 through SS7 nodes (SS7N) 109A, 109B. Base stations 102 and 104 are connected to the IMS/CNI Ring 106 through cell site nodes (CSN) 110A, 110B. The Mobile Switching Center 103 has additional functionality such as billing, administration, and maintenance, requiring additional entities. However, the corresponding description of these entities are not essential to the disclosed feature. Base stations 102 and 104 communicate with mobile subscriber station 121 using RF channels 111 and 112, respectively. RF channels 111 and 112 convey both command messages as well as digital data, which may represent voice signals being articulated at the mobile subscriber station 121 and the far-end party. With a CDMA system, the mobile subscriber station communicates with at least one base station 102. In FIG. 1, the mobile subscriber station 121 is simultaneously communicating with two base stations 102, 104, thus constituting a soft handoff. However, a soft handoff is not limited to a maximum of two base stations. Standard EIA/TIA IS-95-B supports a soft handoff with as many as six base stations. When in a soft handoff, the base stations serving a given call must act in concert so that commands issued over RF channels 111 and 112 are consistent with each other. In order to accomplish this consistency, one of the serving base stations may operate as the primary base station with respect to the other serving base stations. The base stations communicate with other base stations through the cell site nodes 110A, 110B. Of course, a mobile subscriber station 121 may communicate with only a single base station if determined as sufficient by the wireless communications system.

Mobile cellular telecommunication systems provide a plurality of concurrently active communications in the same service area, with the number of concurrently active communication connections exceeding the number of available radio channels. This is accomplished by reusing the channels via the provision of multiple base stations 102, 104 in the service area that is served by a single Mobile Switching Center 103. The overall service area of a Mobile Switching Center 103 is divided into a plurality of "cells", each of which includes a base station 102 and associated radio transmission tower. The radius of the cell is basically the distance from the base station tower to the furthest locus at which good reception between the mobile subscriber station 121 and the base station 102 can be effected. The entire service area of a Mobile Switching Center 103 is therefore covered by a plurality of adjacent cells. There is an industry standard cell pattern in which sets of channels are reused. Within a particular cell, the surrounding cells are grouped in a circle around the first cell and the channels used in these surrounding cells differ from the channels used in the particular cell and from each of the other surrounding cells. Thus, the signals emanating from the radio transmission tower in the particular cell do not interfere with the signals emanating from the radio transmission towers located in each of the surrounding cells because they are at different frequencies and have different orthogonal coding. In addition, the next closest cell using the transmission frequency of the particular cell is far enough away from this cell that there is a significant disparity in signal power and therefore sufficient signal rejection at the receivers to ensure that there is no signal interference. The shape of the cell is determined by the surrounding terrain and is typically not circular, but skewed by irregularities in the terrain, the effect of buildings and vegetation and other signal attenuators present in the cell area. Thus, the cell pattern is simply conceptual in nature and does not reflect the actual physical extent on the various cells, since the implemented cells are not hexagonal in configuration and do not have precisely delimited boundary edges.

The control channels that are available in this system are used to setup the communication connections between the mobile subscriber stations 121 and the base station 102. When a call is initiated, the control channel is used to communicate between the mobile subscriber station 121 involved in the call and the local serving base station 102. The control messages locate and identify the mobile subscriber station 121, determine the dialed number, and identify an available voice/data communication channel consisting of a pair of radio frequencies and orthogonal coding which is selected by the base station 102 for the communication connection. The radio unit in the mobile subscriber station 121 retunes the transmitter-receiver equipment contained therein to use these designated radio frequencies and orthogonal coding. Once the communication connection is established, the control messages are typically transmitted to adjust transmitter power and/or to change the transmission channel when required to handoff this mobile subscriber station 121 to an adjacent cell, when the subscriber moves from the present cell to one of the adjoining cells. The transmitter power of the mobile subscriber station 121 is regulated since the magnitude of the signal received at the base station 102 is a function of the mobile subscriber station transmitter power and the distance from the base station 102. Therefore, by scaling the transmitter power to correspond to the distance from the base station 102, the received signal magnitude can be maintained within a predetermined range of values to ensure accurate signal reception without interfering with other transmissions in the cell.

Wireless Telephone System for Accessing Multiple Stations via a Single Telephone Number The wireless telephone system for accessing multiple stations via a single telephone number 100 provides a single telephone number for a group of subscribers who are equipped with a plurality of stations, including at least one mobile subscriber station 121–123, to thereby enable call connections to be established to any one (ex.121) of the mobile subscriber stations 121–123 in the group when the other stations in the group 122, 123 are in an idle state. A plurality of mobile subscriber stations 121–123 are registered as members of a group that is assigned a single telephone number (AAA) NNN-XXXX. The wireless communication system tracks the present location of the plurality of mobile subscriber stations 121–123 and their present busy/idle status. If a subscriber at mobile subscriber station 121 goes off-hook to originate a call connection, the wireless communication system 1 determines whether any other members of the group 122, 123 are presently engaged in an active call connection using the assigned single telephone number. If not, the call connection proceeds as usual. If the single telephone number is presently in use, the wireless communication system 1 can provide one of a number of possible call processing options to indicate the present use of the single telephone number. Thus, the time-sharing of the single telephone number among a plurality of individuals in a group conserves telephone numbers and results in service conflicts only if multiple service requests are concurrently received. By the use of traffic engineering criteria, the instances of such service conflicts can be kept to a minimum.

Figure 2:
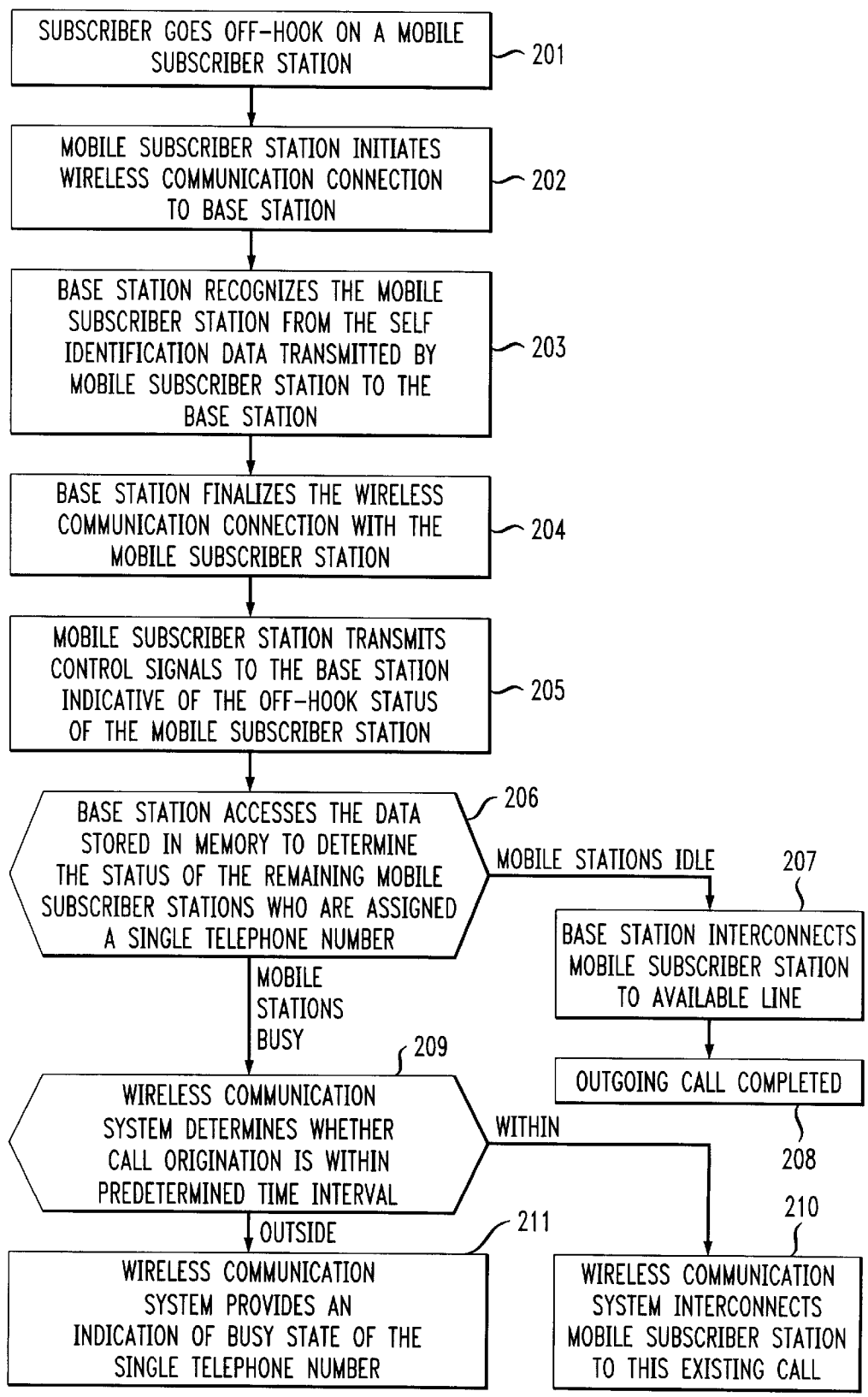
FIGS. 2–3 illustrate in flow diagram form the operation of the present wireless telephone system for accessing multiple stations via a single telephone number to process communication connections.
Figure 3:
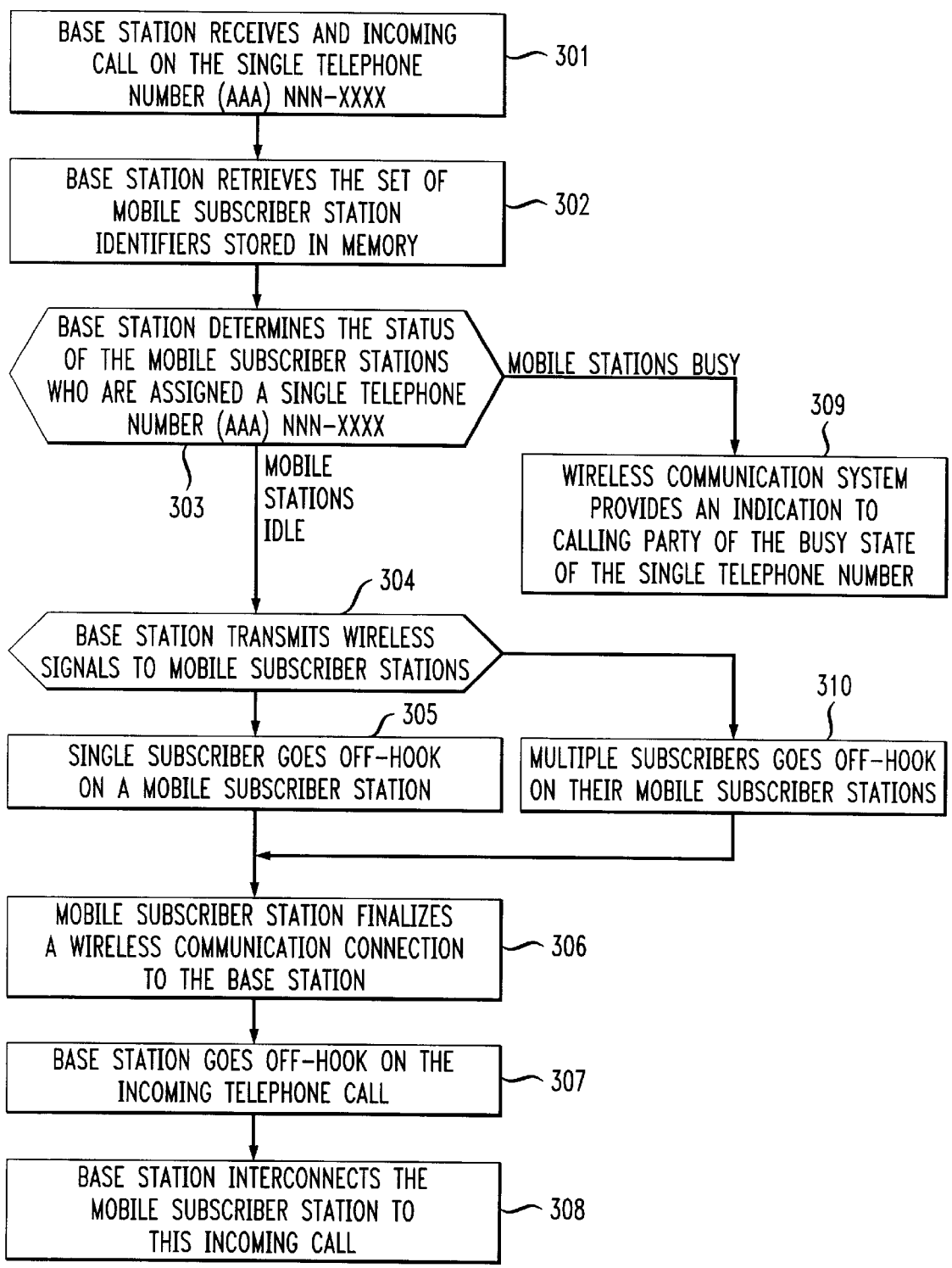

FIGS. 2 and 3 illustrate in flow diagram form the operation of the present wireless telephone system for accessing multiple stations via a single telephone number 100. The wireless communication system 1 maintains a set of data files in memory 125 indicative of the present state and present location of all mobile subscriber stations extant in the service area of wireless communication system 1, including mobile subscriber stations 121–123, who are assigned a single telephone number (AAA) NNN-XXXX. A subscriber can go off-hook on any of the mobile subscriber stations (ex.—121) at step 201 and have the mobile subscriber station 121 at step 202 initiate a wireless communication connection via a selected wireless communication channel to the base station 102. At step 203, the base station 102 recognizes the mobile subscriber station 121 from the self identification data transmitted by the mobile subscriber station 121 to the base station 102 as part of the wireless communication connection initiation. The base station 102 finalizes the wireless communication connection with the mobile subscriber station 121 at step 204 if the identification of the mobile subscriber station 121 matches the set of mobile subscriber station identifiers and authorizations stored in memory 125 in the base station 102. At step 205, the mobile subscriber station 121 transmits control signals to the base station 102 indicative of the off-hook status of the mobile subscriber station 121. At step 206, the base station 102 accesses the data stored in memory 125 to determine the status of the remaining mobile subscriber stations 122, 123, who are assigned a single telephone number (AAA) NNN-XXXX. The base station 102 at step 207 interconnects the mobile subscriber station 121 to an available line if the remaining mobile subscriber stations 122, 123, who are assigned a single telephone number (AAA) NNN-XXXX are in an idle state. The communication connection is then processed at step 208 in well known manner to enable the subscriber to obtain the requested communication services.

If the base station at step 206 determines that one or more of the remaining mobile subscriber stations 122, 123, who are assigned a single telephone number (AM) NNN-XXXX are in a busy state, then the wireless communication system 1 determines whether the call origination has occurred within a predetermined time interval after the origination of the existing call. If this call origination is outside of the time interval, then at step 210, the wireless communication system 1 provides an indication to the subscriber of the busy state of the single telephone number and optionally can provide the call originating party a set of predetermined call processing options, such as: provide an indication to the exisitng call connection and drop that call connection to enable the processing of the new call origination, provide the subscriber with a prerecorded message to indicate the present use of the single telephone number, bridge the subscriber on to the existing call connection, deny service and provide an audible indication, such as a busy signal, provide the existing call connection with a call waiting signal. Any one of these options can be programmed into the wireless communication system 1 to automatically be executed, rather than being provided to the call originating party as options. Alternatively, if this call origination is inside of the time interval, then at step 211, the wireless communication system 1 bridges the subscriber on to the existing call connection.

Similarly, in response to receipt of an incoming call to the single telephone number from the Public Switched Telephone Network, the base station 102 transmits control signals to the plurality of mobile subscriber stations 121–123 to activate signaling devices contained therein to alert the subscriber to the presence of an incoming call. Thus, as shown in flow diagram form in FIG. 3, at step 301 the base station 102 receives an incoming call on the single telephone number (AAA) NNN-XXXX from the Public Switched Telephone Network. The base station 102 at step 302 retrieves the set of mobile subscriber station identifiers stored in memory 125 in the base station 102 to identify which mobile subscriber stations 121–123 are authorized to receive an incoming call or an incoming call from the calling party. At step 303, the base station 102 accesses the data stored in memory 125 to determine the status of the remaining mobile subscriber stations 122,123, who are assigned a single telephone number (MA) NNN-XXXX. If the mobile subscriber stations 121–123, who are assigned a single telephone number (AM) NNN-XXXX, are in an idle state, base station 102 at step 304 transmits wireless signals to all (or a selected subset) of the mobile subscriber stations 121–123 to initiate a wireless communication connection via a selected wireless communication channel to a mobile subscriber station 121–123, optionally announcing the identity of the calling party. At step 305, in response to the audible alert signal broadcast by the mobile subscriber stations 121–123, the subscriber goes off-hook on any of the mobile subscriber stations 121 and the mobile subscriber station 121 at step 306 finalizes a wireless communication connection via a selected wireless communication channel to the base station 102. At step 307, the base station 102 goes off-hook on the incoming telephone call from the Public Switched Telephone Network and interconnects the mobile subscriber station 121 to this incoming call at step 308. The communication connection is then processed in well known manner to enable the subscriber to answer the incoming call. Alternatively, if more than one subscriber goes off hook on their respective mobile subscriber stations 121, 122 at step 310 within a predetermined time interval, in response to the audible alert signal broadcast by the base station 102 at step 304, then all of the subscribers who responded to the audible alert are bridged on to the incoming call and steps 306–308 are executed for multiple subscribers, rather than one.

If the base station at step 304 determines that one of the mobile subscriber stations 121–123, who are assigned a single telephone number (AAA) NNN-XXXX are in a busy state, then the wireless communication system 1 provides an indication to the mobile subscriber station of the presence of an incoming call at step 309, typically via a call waiting indication. The wireless communication system 1 also provides an indication to the calling party of the busy state of the single telephone number, typically at a predetermined delay after the call waiting indication is provided at step 309. In implementing this indication, the wireless communication system 1 can: provide the calling party with a prerecorded message to indicate the present use of the single telephone number, redirect the incoming call to a voice messaging system, deny service and provide an audible indication, such as a busy signal.

Summary

The wireless telephone system for accessing multiple stations via a single telephone number provides a single telephone number for a group of subscribers who are equipped with a plurality of stations, including at least one mobile subscriber station, to thereby enable call connections to be established to any one of the mobile subscriber stations in the group when the other stations in the group are in an idle state. The time-sharing of the single telephone number among a plurality of individuals in a group conserves telephone numbers and results in service conflicts only if multiple service requests are concurrently received. By the use of traffic engineering criteria, the instances of such service conflicts can be kept to a minimum.

What is claimed:

1. A wireless telephone system for providing a subscriber at a mobile subscriber station with communication connections to a telephone switching system, using a single telephone number to serve a plurality of mobile subscriber stations, comprising:

means for assigning a plurality of mobile subscriber stations, each of which has assigned thereto a unique equipment identification, a single telephone number on said telephone switching system, said single telephone number being the exclusive access to said plurality of mobile subscriber stations via said telephone switching system;

means for storing data, representative of said unique equipment identification for each of said plurality of mobile subscriber stations served by said single telephone number, in a memory;

means, responsive to receipt of a service request for one of said plurality of mobile subscriber stations served by said single telephone number, for retrieving said stored data representative of said unique equipment identification for all of said plurality of mobile subscriber stations served by said single telephone number;

means for determining an availability of all of said plurality of mobile subscriber stations served by said single telephone number; and means for servicing said service request for said one of said plurality of mobile subscriber stations only if said determining means determines that all other of said plurality of mobile subscriber stations served by said single telephone number are idle.

2. The wireless telephone system of claim 1 wherein said means for servicing comprises:

means for uniquely identifying said one mobile subscriber station;

means for reading said data, indicative of said unique identity of each of said plurality of mobile subscriber stations served by said single telephone number, from said memory; and means for determining a state for each of said plurality of mobile subscriber stations served by said single telephone number.

3. The wireless telephone system of claim 2 wherein said means for servicing further comprises:
   means for maintaining data in a memory indicative of service authorizations for each of said plurality of mobile subscriber stations served by said single telephone number;
   means, responsive to receipt of a service request for said one mobile subscriber stations served by said single telephone number, for comparing said service request to said maintained data stored in said memory for said one mobile subscriber station; and
   means, responsive to said means for comparing identifying a match between said service request to said maintained data for said one mobile subscriber station, for providing said service to said one mobile subscriber station.

4. The wireless telephone system of claim 2 wherein said means for servicing further comprises:
   means, responsive to any other of said plurality of mobile subscriber stations served by said single telephone number being in an active state, for providing said one mobile subscriber station with an indication that said service request is preceeded by a prior service request.

5. The wireless telephone system of claim 2 wherein said means for determining comprises:
   means for storing data in said memory indicative of a present location of each of said plurality of mobile subscriber stations served by said single telephone number; and
   means for storing data in said memory indicative of a present state of each of said plurality of mobile subscriber stations served by said single telephone number.

6. The wireless telephone system of claim 5 wherein said means for determining further comprises:
   means for periodically polling each of said plurality of mobile subscriber stations served by said single telephone number to update said data stored in said memory.

7. A method of operating a wireless telephone system for providing a subscriber at a mobile subscriber station with communication connections to a telephone switching system, using a single telephone number to serve a plurality of mobile subscriber stations, comprising;
   assigning a plurality of mobile subscriber stations, each of which has assigned thereto a unique equipment identification, a single telephone number on said telephone switching system, said single telephone number being the exclusive access to said plurality of mobile subscriber stations via said telephone switching system;
   storing data, representative of said unique equipment identification for each of said plurality of mobile subscriber stations served by said single telephone number, in a memory;
   servicing, In response to receipt of a service request for one of said plurality of mobile subscriber stations served by said single telephone number, for retrieving said stored data representative of said unique equipment identification for all of said plurality of mobile subscriber stations served by said single telephone number;
   determining an availability of all of said plurality of mobile subscriber stations served by said single telephone number; and
   servicing said service request for said one of said plurality of mobile subscriber stations only if said determining means determines that all said service request only if all other of said plurality of mobile subscriber stations served by said single telephone number are idle.

8. The method of operating a wireless telephone system of claim 7 wherein said step of servicing comprises:
   uniquely Identifying said one mobile subscriber station;
   reading said data, indicative of said unique identity of each of said plurality of mobile subscriber stations served by said single telephone number, from said memory; and
   determining a state for each of said plurality of mobile subscriber stations served by said single telephone number.

9. The method of operating a wireless telephone system of claim 8 wherein said step of servicing further comprises:
   maintaining data in a memory indicative of service authorizations for each of said plurality of mobile subscriber stations served by said single telephone number;
   comparing, in response to receipt of a service request for said one mobile subscriber stations served by said single telephone number, said service request to said maintained data stored in said memory for said one mobile subscriber station; and
   providing, in response to said step of comparing identifying a match between said service request to said maintained data for said one mobile subscriber station, said service to said one mobile subscriber station.

10. The method of operating a wireless telephone system of claim 8 wherein said step of servicing further comprises:
    providing, in response to any other of said plurality of mobile subscriber stations served by said single telephone number being in an active state, said one mobile subscriber station with an indication that said service request is is preceeded by a prior service request.

11. The method of operating a wireless telephone system of claim 8 wherein said step of determining comprises:
    storing data in said memory indicative of a present location of each of said plurality of mobile subscriber stations served by said single telephone number; and
    storing data in said memory indicative of a present state of each of said plurality of mobile subscriber stations served by said single telephone number.

12. The method of operating a wireless telephone system of claim 11 wherein said step of determining further comprises:
    periodically polling each of said plurality of mobile subscriber stations served by said single telephone number to update said data stored in said memory.

13. A wireless telephone system for providing a subscriber at a mobile subscriber station with communication connections to a telephone switching system, using a single telephone number to serve a plurality of mobile subscriber stations, comprising:
    telephone number means for assigning a plurality of mobile subscriber stations, each of which has assigned thereto a unique equipment identification, a single telephone number on said telephone switching system, said single telephone number being the exclusive access to said plurality of mobile subscriber stations via said telephone switching system;
    mobile subscriber registration means for storing data, representative of said unique equipment identification for each of said plurality of mobile subscriber stations served by said single telephone number, in a memory;
    service arbitration means, responsive to receipt of a service request for one of said plurality of mobile subscriber stations served by said single telephone number, for retrieving said stored data representative of said unique equipment identification for all of said plurality of mobile subscriber stations served by said single telephone number;

status determining means for determining an availability of all of said plurality of mobile subscriber stations served by said single telephone number; and call completion means for servicing said service request for said one of said plurality of mobile subscriber stations only if said determining means determines that all other of said plurality of mobile subscriber stations served by said single telephone number are idle.

14. The wireless telephone system of claim 13 wherein said service arbitration means comprises:

station validation means for uniquely identifying said one mobile subscriber station;

file retrieval means for reading said data, indicative of said unique identity of each of said plurality of mobile subscriber stations served by said single telephone number, from said memory; and state identification means for determining a state for each of said plurality of mobile subscriber stations served by said single telephone number.

15. The wireless telephone system of claim 14 wherein said service arbitration means further comprises:

service subscription means for maintaining data in a memory indicative of service authorizations for each of said plurality of mobile subscriber stations served by said single telephone number;

service authorization means, responsive to receipt of a service request for said one mobile subscriber stations served by said single telephone number, for comparing said service request to said maintained data stored in said memory for said one mobile subscriber station; and service enabling means, responsive to said service authorization means identifying a match between said service request to said maintained data for said one mobile subscriber station, for providing said service to said one mobile subscriber station.

16. The wireless telephone system of claim 14 wherein said service arbitration means further comprises:

service availability means, responsive to any other of said plurality of mobile subscriber stations served by said single telephone number being in an active state, for providing said one mobile subscriber station with an indication that said service request is preceeded by a prior service request.

17. The wireless telephone system of claim 14 wherein said state identification means comprises:

station location means for storing data in said memory indicative of a present location of each of said plurality of mobile subscriber stations served by said single telephone number; and station state means for storing data in said memory indicative of a present state of each of said plurality of mobile subscriber stations served by said single telephone number.

18. The wireless telephone system of claim 17 wherein said state identification means further comprises:

station polling means for periodically polling each of said plurality of mobile subscriber stations served by said single telephone number to update said data stored in said memory.

\* \* \* \* \*